(12) United States Patent
DeWitte et al.

(10) Patent No.: US 12,431,249 B2
(45) Date of Patent: Sep. 30, 2025

(54) NUCLEAR REACTOR FOR HEAT AND POWER GENERATION

(71) Applicant: Oklo Inc., Santa Clara, CA (US)

(72) Inventors: Jacob DeWitte, Mountain View, CA (US); Patrick Everett, San Francisco, CA (US)

(73) Assignee: Oklo Inc., Santa Clara, CA (US)

( * ) Notice: Subject to any disclaimer, the term of this patent is extended or adjusted under 35 U.S.C. 154(b) by 0 days.

(21) Appl. No.: 18/722,164

(22) PCT Filed: Dec. 20, 2022

(86) PCT No.: PCT/US2022/082086
§ 371 (c)(1),
(2) Date: Jun. 20, 2024

(87) PCT Pub. No.: WO2024/049490
PCT Pub. Date: Mar. 7, 2024

(65) Prior Publication Data
US 2024/0420855 A1    Dec. 19, 2024

Related U.S. Application Data

(60) Provisional application No. 63/291,762, filed on Dec. 20, 2021.

(51) Int. Cl.
*G21C 15/02* (2006.01)
*G21C 15/06* (2006.01)
(Continued)

(52) U.S. Cl.
CPC ............. *G21C 15/02* (2013.01); *G21C 15/06* (2013.01); *G21C 15/26* (2013.01); *G21D 3/08* (2013.01); *G21D 5/08* (2013.01)

(58) Field of Classification Search
CPC .................................. G21C 15/02; G21C 15/16
See application file for complete search history.

(56) References Cited

U.S. PATENT DOCUMENTS 3,507,747 A * 4/1970 Strohmeyer, Jr. ........ G21D 5/06
376/241
3,578,563 A * 5/1971 Strohmeyer, Jr. ...... G21C 15/02
330/3
(Continued)

FOREIGN PATENT DOCUMENTS

JP          H0634069 A    *  2/1994
WO     WO-2012075010 A1  *  6/2012  ............. G21C 15/02
WO        2021071599 A2      4/2021

OTHER PUBLICATIONS

International Preliminary Report on Patentability in International Appln. No. PCT/US2022/082086, mailed on Jul. 4, 2024, 13 pages.
(Continued)

*Primary Examiner* — Lily C Garner
(74) *Attorney, Agent, or Firm* — Fish & Richardson P.C.

(57) ABSTRACT

A nuclear reactor power system includes: a reactor core comprising a plurality of nuclear fuel elements, each nuclear fuel element comprising: a first cooling channel passing through the nuclear fuel element; and a second cooling channel passing through the nuclear fuel element and fluidly isolated from the first cooling channel; a first cooling system configured to transport a first fluid coolant through the reactor core, the first cooling system fluidly connected to the first cooling channel of each nuclear fuel element; and a second cooling system configured to transport a second fluid coolant through the reactor core, the second cooling system fluidly connected to the second cooling channel of each nuclear fuel element. A direction of first fluid coolant flow through the first cooling channel is the same as a direction of second fluid coolant flow through the second cooling channel.

117 Claims, 6 Drawing Sheets

(51) Int. Cl.
    *G21C 15/26*     (2006.01)
    *G21D 3/08*     (2006.01)
    *G21D 5/08*     (2006.01)

(56)     References Cited

U.S. PATENT DOCUMENTS

| | | | | |
|---|---|---|---|---|
| 3,634,189 | A * | 1/1972 | Germer | G21C 1/082 |
| | | | | 976/DIG. 19 |
| 4,035,231 | A * | 7/1977 | Ventre | G21C 15/18 |
| | | | | 376/282 |
| 2009/0252283 | A1 * | 10/2009 | Ahlfeld | G21C 3/64 |
| | | | | 376/451 |
| 2012/0288048 | A1 * | 11/2012 | Mann | G21C 7/22 |
| | | | | 376/327 |
| 2014/0090249 | A1 * | 4/2014 | McWhirter | F28D 1/0213 |
| | | | | 29/890.053 |
| 2018/0322968 | A1 * | 11/2018 | Cheatham, III | G21C 15/22 |

OTHER PUBLICATIONS

PCT Invitation to Pay Additional Fees and, Where Applicable, Protest Fee in International Appln. No. PCT/US2022/082086, mailed on Apr. 16, 2024, 13 pages.

International Search Report and Written Opinion in related International Application No. PCT/US2022/082086, dated Jun. 7, 2024, 17 pages.

* cited by examiner

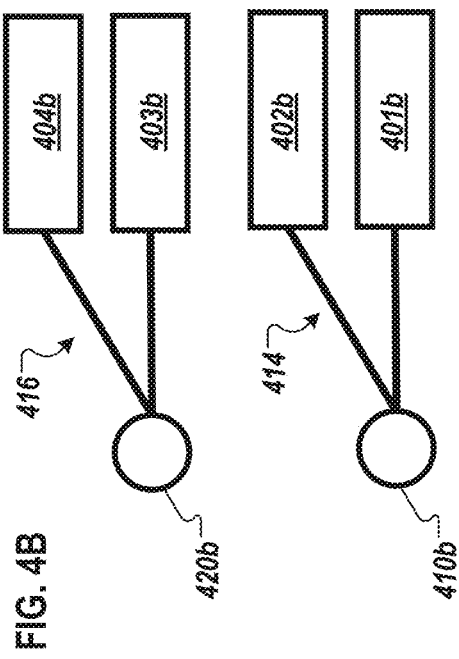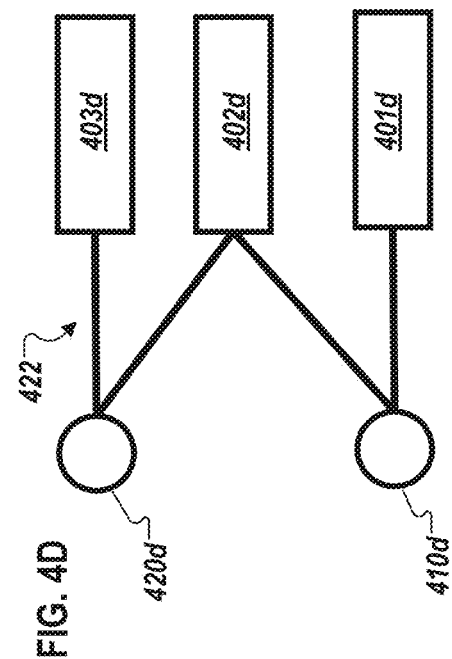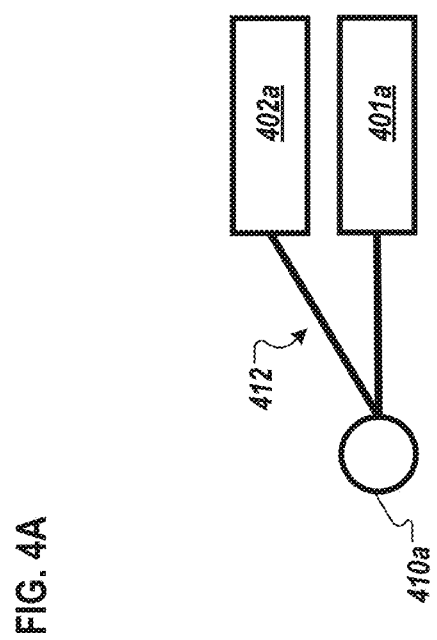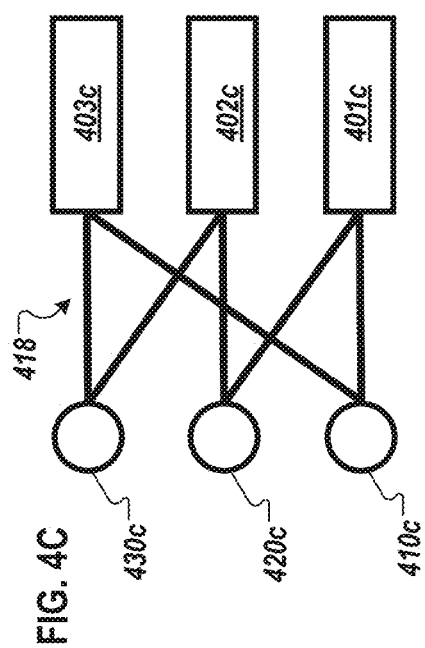

NUCLEAR REACTOR FOR HEAT AND POWER GENERATION

CROSS-REFERENCE TO RELATED APPLICATIONS

This application is a U.S. National Stage Application under 35 U.S.C. § 371 and claims the benefit of International Application No. PCT/US2022/082086 filed Dec. 20, 2022, which claims the benefit of U.S. Provisional Patent Application Ser. No. 63/291,762 filed on Dec. 20, 2021, which is incorporated herein by reference in its entirety.

TECHNICAL FIELD

The present disclosure relates generally to nuclear reactors, and more specifically to reactors designed for reliable power and heat generation.

BACKGROUND

Global energy growth and a drive to reduce pollution and emissions is stimulating new activity around the commercialization and design of new reactor technologies. Some of these technologies include reactors designed to provide high reliability power that is long lasting and resilient.

SUMMARY

In an example implementation, a nuclear reactor power system includes: a reactor core including a plurality of nuclear fuel elements, each of the plurality of nuclear fuel elements including: a first cooling channel passing through the nuclear fuel element; and a second cooling channel passing through the nuclear fuel element and is fluidly isolated from the first cooling channel; a first cooling system configured to transport a first fluid coolant through the reactor core, the first cooling system fluidly connected to the first cooling channel of each nuclear fuel element; and a second cooling system configured to transport a second fluid coolant through the reactor core, the second cooling system fluidly connected to the second cooling channel of each nuclear fuel element.

In aspect combinable with the example implementation, the first cooling system is fluidly isolated from the second cooling system.

In an aspect combinable with any of the previous aspects, in a first mode of operation, a first volume of the first fluid coolant flows through the first cooling system, and a second volume of the second fluid coolant flows through the second cooling system, and in a second mode of operation, a first volume of the first fluid coolant flows through the first cooling system, and no second fluid coolant flows through the second cooling system.

In an aspect combinable with any of the previous aspects, the power system is configured to operate at or near one hundred percent of rated reactor power during operation in both the first mode of operation and the second mode of operation.

In an aspect combinable with any of the previous aspects, during operation in the first mode of operation, at least one of the first volume of the first fluid coolant or the second volume of the second fluid coolant is transported by natural circulation.

In an aspect combinable with any of the previous aspects, the first fluid coolant is the same as the second fluid coolant.

In an aspect combinable with any of the previous aspects, the first fluid coolant is different from the second fluid coolant.

In an aspect combinable with any of the previous aspects, during operation in the second mode of operation, the first volume of first fluid coolant is transported by natural circulation.

In an aspect combinable with any of the previous aspects, during operation in the first mode of operation: the first volume of the first fluid coolant flows from the first cooling system through the first cooling channel of each nuclear fuel element; and the second volume of the second fluid coolant flows from the second cooling system through the second cooling channel of each nuclear fuel element.

In an aspect combinable with any of the previous aspects, the first cooling channel and the second cooling channel each have a cylindrical shape, a cylindrical axis of the first cooling channel being parallel to a cylindrical axis of the second cooling channel.

In an aspect combinable with any of the previous aspects, a direction of first fluid coolant flow through the first cooling channel is the same as a direction of second fluid coolant flow through the second cooling channel.

In an aspect combinable with any of the previous aspects, the system includes: a first heat exchanger configured to transfer heat from the first fluid coolant in the first cooling system to a first intermediate coolant of a first intermediate coolant loop; and a second heat exchanger configured to transfer heat from the second fluid coolant in the second cooling system to a second intermediate coolant of a second intermediate coolant loop.

In an aspect combinable with any of the previous aspects, intermediate coolant flows through the first intermediate coolant loop and the second intermediate coolant loop by natural circulation.

In an aspect combinable with any of the previous aspects, the system includes a first heat exchanger configured to transfer heat from the first fluid coolant in the first cooling system to a first intermediate coolant of a first intermediate coolant loop; and a second heat exchanger configured to transfer heat from the second fluid coolant in the second cooling system to the first intermediate coolant of the first intermediate coolant loop.

In an aspect combinable with any of the previous aspects, the first heat exchanger and the second heat exchanger are each configured to transfer heat at levels corresponding to reactor power levels at or near one hundred percent of rated reactor power.

In an aspect combinable with any of the previous aspects, the system includes a third heat exchanger configured to transfer heat from the first intermediate coolant in the first intermediate coolant loop to a power conversion working fluid of a first power conversion system; and a fourth heat exchanger configured to transfer heat from the second intermediate coolant in the second intermediate coolant loop to a power conversion working fluid of a second power conversion system.

In an aspect combinable with any of the previous aspects, at least one of the first intermediate coolant loop or the second intermediate coolant loop is configured to transfer heat to multiple power conversion systems.

In an aspect combinable with any of the previous aspects, during operation, the first power conversion system and the second power conversion system each operates independently.

In an aspect combinable with any of the previous aspects, the first power conversion system includes a first turbine, the second power conversion system includes a second turbine, and each of the first turbine and the second turbine are configured to operate at power levels corresponding to reactor power levels at or near one hundred percent of rated reactor power.

In an aspect combinable with any of the previous aspects, each of the nuclear fuel elements further includes: a third cooling channel passing through the nuclear fuel element; and a fourth cooling channel passing through the nuclear fuel element. The first cooling system is fluidly connected to the third cooling channel of each nuclear fuel element; and the second cooling system is fluidly connected to the fourth cooling channel of each nuclear fuel element.

In an aspect combinable with any of the previous aspects, the third cooling channel and the fourth cooling channel each have a cylindrical shape, a cylindrical axis of the third cooling channel being parallel to a cylindrical axis of the fourth cooling channel.

In an aspect combinable with any of the previous aspects, a direction of first fluid flow through the third cooling channel is the same as a direction of second fluid flow through the fourth cooling channel.

In an aspect combinable with any of the previous aspects, the first fluid coolant and the second fluid coolant each includes at least one of water, liquid metal, liquid salt, supercritical fluid, or gas.

In another example implementation, a nuclear reactor power system includes: a reactor core; a primary cooling system configured to transport a primary fluid coolant through the reactor core; a first heat exchanger configured to transfer heat from the primary fluid coolant in the primary cooling system to a first intermediate coolant of a first intermediate coolant loop; and a second heat exchanger configured to transfer heat from the primary fluid coolant in the primary cooling system to a second intermediate coolant of a second intermediate coolant loop. The first intermediate coolant loop is fluidly isolated from the second intermediate coolant loop.

In an aspect combinable with the example implementation, intermediate coolant flows through the first intermediate coolant loop and the second intermediate coolant loop by natural circulation.

In an aspect combinable with any of the previous aspects, the first heat exchanger and the second heat exchanger are each configured to transfer heat at levels corresponding to reactor power levels at or near one hundred percent of rated reactor power.

In an aspect combinable with any of the previous aspects, the system includes a third heat exchanger configured to transfer heat from the first intermediate coolant in the first intermediate coolant loop to a power conversion working fluid of a first power conversion system; and a fourth heat exchanger configured to transfer heat from the second intermediate coolant in the second intermediate coolant loop to a power conversion working fluid of a second power conversion system.

In an aspect combinable with any of the previous aspects, at least one of the first intermediate coolant loop or the second intermediate coolant loop is configured to transfer heat to multiple power conversion systems.

In an aspect combinable with any of the previous aspects, during operation, the first power conversion system and the second power conversion system each operates independently.

In an aspect combinable with any of the previous aspects, the first power conversion system includes a first turbine, the second power conversion system includes a second turbine, and each of the first turbine and the second turbine are configured to operate at power levels corresponding to reactor power levels at or near one hundred percent of rated reactor power.

In another example implementation, a nuclear reactor power system, including, a reactor core; a primary cooling system configured to transport a primary fluid coolant through the reactor core: a first heat exchanger configured to transfer heat from the primary fluid coolant in the primary cooling system to an intermediate coolant of an intermediate coolant loop; a second heat exchanger configured to transfer heat from the intermediate coolant in the intermediate coolant loop to a power conversion working fluid of a first power conversion system; and a third heat exchanger configured to transfer heat from the intermediate coolant in the intermediate coolant loop to a power conversion working fluid of a second power conversion system. The first power conversion system is fluidly isolated from the second power conversion system.

In aspect combinable with the example implementation, during operation, the first power conversion system and the second power conversion system each operates independently.

In an aspect combinable with any of the previous aspects, the first power conversion system includes a first turbine, the second power conversion system includes a second turbine, and each of the first turbine and the second turbine are configured to operate at power levels corresponding to reactor power levels at or near one hundred percent of rated reactor power.

In an aspect combinable with any of the previous aspects, the system includes a third power conversion system that is fluidly isolated from the second power conversion system and the first power conversion system.

In an aspect combinable with any of the previous aspects, the system includes a fourth power conversion system that is fluidly isolated from the third power conversion system, the second power conversion system, and the first power conversion system.

In an aspect combinable with any of the previous aspects, each power conversion system of a plurality of power conversion systems is configured to operate independently from each other power conversion system.

In an aspect combinable with any of the previous aspects, the intermediate coolant flows through the intermediate cooling loop by natural circulation.

In an aspect combinable with any of the previous aspects, the intermediate coolant flows through the intermediate cooling loop by forced circulation.

In an aspect combinable with any of the previous aspects, the intermediate cooling loop includes two or more pumps configured to drive the forced circulation of the intermediate coolant.

In an aspect combinable with any of the previous aspects, the intermediate cooling loop is coupled to at least one thermal energy storage unit.

In an aspect combinable with any of the previous aspects, the intermediate coolant includes at least one of water, liquid metal, liquid salt, supercritical fluid, or gas.

In another example implementation, a method includes operating the nuclear reactor power system of any one of previous implementations to produce electrical power.

In aspect combinable with the example implementation, during a first mode of operation, two or more power conversion systems of the plurality of power conversion systems each operate at a power level corresponding to less than one hundred percent of rated reactor power.

In an aspect combinable with any of the previous aspects, during operation of the two or more power conversion systems, a total power output of the reactor is one hundred percent of rated reactor power.

In an aspect combinable with any of the previous aspects, during a second mode of operation, a first power conversion system of the two or more power conversion systems operates at a power level corresponding to one hundred percent of rated reactor power, and a second power conversion system of the two or more power conversion systems is in standby.

In an aspect combinable with any of the previous aspects, the method includes including switching between operating the nuclear reactor power system in the first mode of operation and operating the nuclear reactor power system in the second mode of operation.

In an aspect combinable with any of the previous aspects, switching between operating the nuclear reactor power system in the first mode of operation and operating the nuclear reactor power system in the second mode of operation is controlled by one or more of batteries, capacitors, or power electronics.

In an aspect combinable with any of the previous aspects, the method includes switching between operating the nuclear reactor power system in the first mode of operation and operating the nuclear reactor power system in the second mode of operation in response to a failure of the second power conversion system.

In another example implementation, a nuclear reactor power system includes a reactor core including a fuel assembly region including a plurality of nuclear fuel elements arranged in parallel and extending from a first end of the fuel assembly region to a second end of the fuel assembly region; a plate positioned adjacent to a first end of the fuel assembly region, the plate including one or more orifices. A change in a size of the one or more orifices causes a change in a flow volume of fluid coolant through the reactor core.

In an aspect combinable with the example implementation, the plate is positioned between a coolant inlet and the fuel assembly region; and fluid coolant enters the fuel assembly region through the one or more orifices of the plate.

In an aspect combinable with any of the previous aspects, the plate is positioned between a coolant outlet and the fuel assembly region; and fluid coolant exits the fuel assembly region through the one or more orifices of the plate.

In an aspect combinable with any of the previous aspects, the system includes a second plate positioned adjacent to the second end of the fuel assembly region.

In an aspect combinable with any of the previous aspects, the plate is formed from expandable materials configured to expand or contract with changing temperatures.

In an aspect combinable with any of the previous aspects, the plate is formed from expandable materials configured to expand or contract with changing radiation levels.

In an aspect combinable with any of the previous aspects, expansion or contraction of the expandable materials causes the change in the size of the one or more orifices.

In another example implementation, a nuclear reactor power system includes a reactor core including a fuel assembly region including a plurality of fuel pins; and a mass spectrometer positioned adjacent to the fuel assembly. The mass spectrometer is configured to detect the presence of one or more failed fuel pins in the fuel assembly.

In an aspect combinable with the example implementation, the mass spectrometer is positioned in a cover gas plenum of the reactor core.

In an aspect combinable with any of the previous aspects, the reactor core is cooled by liquid metal coolant, by gas coolant, by water, or by molten salt coolant.

In an aspect combinable with any of the previous aspects, the mass spectrometer is configured to detect the presence of one or more failed fuel pins based on detecting the presence of at least one of fission gases or pre-filled fuel pin tag gases.

In an aspect combinable with any of the previous aspects, the system includes a plurality of mass spectrometers. The plurality of mass spectrometers is configured to detect the presence of one or more failed fuel pins in the fuel assembly based on two or more of the mass spectrometers detecting the presence of the at least one of fission gases or pre-filled fuel pin tag gases.

In an aspect combinable with any of the previous aspects, a failed fuel pin includes a leaking fuel pin.

In an aspect combinable with any of the previous aspects, the nuclear reactor power system includes fuel including a fissile material such as uranium-233, uranium-235, or plutonium-239; a coolant to transport heat away from the fuel, a heat exchanger to transfer the heat from the coolant or cooling device to a power conversion system, and instrumentation, supporting structures and shielding.

In an aspect combinable with any of the previous aspects, the fissile material can be contained in fuel elements. The fuel elements can be held inside a reactor vessel.

In an aspect combinable with any of the previous aspects, primary coolant transfers heat from the fuel, and carries the heat to a heat exchanger where the heat is transferred to an intermediate coolant or to a power conversion working fluid.

In an aspect combinable with any of the previous aspects, multiple heat exchangers are used that are independently sized individually or in redundant sets to transfer heat at desired power levels up to one hundred percent of rated reactor power.

In an aspect combinable with any of the previous aspects, the redundant heat exchanger systems are part of redundant and independent power conversion systems.

In an aspect combinable with any of the previous aspects, the reactor's heat can be converted to usable heat or electricity via these independent heat transport pathways.

In an aspect combinable with any of the previous aspects, a reactor can be coupled to more than one turbine-generator system, each of which can operate at up to one hundred percent reactor power.

In an aspect combinable with any of the previous aspects, a decay heat removal auxiliary cooling system is used to passively remove decay heat from the reactor vessel.

In an aspect combinable with any of the previous aspects, external cooling can remove heat from the reactor vessel system via a fluid, such as air, or a liquid.

In an aspect combinable with any of the previous aspects, the primary coolant is transported by natural circulation, transferring heat by natural convection.

In an aspect combinable with any of the previous aspects, the primary coolant flows via natural circulation at steady state conditions ranging in power levels spanning from reactor startup to full power.

In an aspect combinable with any of the previous aspects, the primary coolant can be water, liquid metal, liquid salt, a supercritical fluid, or gas.

In an aspect combinable with any of the previous aspects, primary heat transport is accomplished using heat pipes.

In an aspect combinable with any of the previous aspects, one or more booster pumps are used to facilitate reactor startup by establishing flow patterns via forced and mixed circulation, which transitions to natural circulation at specified power levels, and the pumps are shut down.

In an aspect combinable with any of the previous aspects, one or more intermediate cooling loops is present.

In an aspect combinable with any of the previous aspects, one or more intermediate cooling loops operate on natural circulation.

In an aspect combinable with any of the previous aspects, maintaining sufficient coolant chemistry and purity control is provided to ensure coolant and component longevity.

In an aspect combinable with any of the previous aspects, a passive coolant chemistry control system is used that is sized to reduce maintenance over the plant operative lifetime.

In an aspect combinable with any of the previous aspects, the independent heat transport and power conversion systems are operated such that only one is producing power while the other systems are on standby.

In an aspect combinable with any of the previous aspects, the independent heat transport and power conversion systems are operated such that more than one independent system is operated at reduced capacity such that the total output is one hundred percent of rated power.

In an aspect combinable with any of the previous aspects, the system includes multiple heat exchangers configured to transfer heat from the liquid metal coolant to an intermediate coolant.

In an aspect combinable with any of the previous aspects, the system includes heat exchangers configured to transfer heat from the liquid metal coolant to a power conversion working fluid.

In an aspect combinable with any of the previous aspects, the heat exchanger is a low pressure drop heat exchanger.

In an aspect combinable with any of the previous aspects, one or more heat exchangers are rated to independently transfer at least one hundred percent of reactor power.

In an aspect combinable with any of the previous aspects, the system includes a passively operated cold trap configured to purify liquid metal coolant.

In an aspect combinable with any of the previous aspects, during operation, the liquid metal coolant flows through the reactor by natural circulation.

In an aspect combinable with any of the previous aspects, the liquid metal coolant is transported by natural circulation at steady-state conditions at power levels ranging from reactor startup to fill power.

In an aspect combinable with any of the previous aspects, the system includes a booster pump configured to pump the liquid metal coolant through the reactor.

In an aspect combinable with any of the previous aspects, the intermediate coolant includes the same fluid as the liquid metal coolant.

In another example implementation, a method includes operating the nuclear reactor power system of any one of the previous implementations to produce electrical power.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIGS. 4A to 4D are diagrams of example configurations of reactor power systems and power conversion systems according to the present disclosure.

DETAILED DESCRIPTION

Figure 1A:
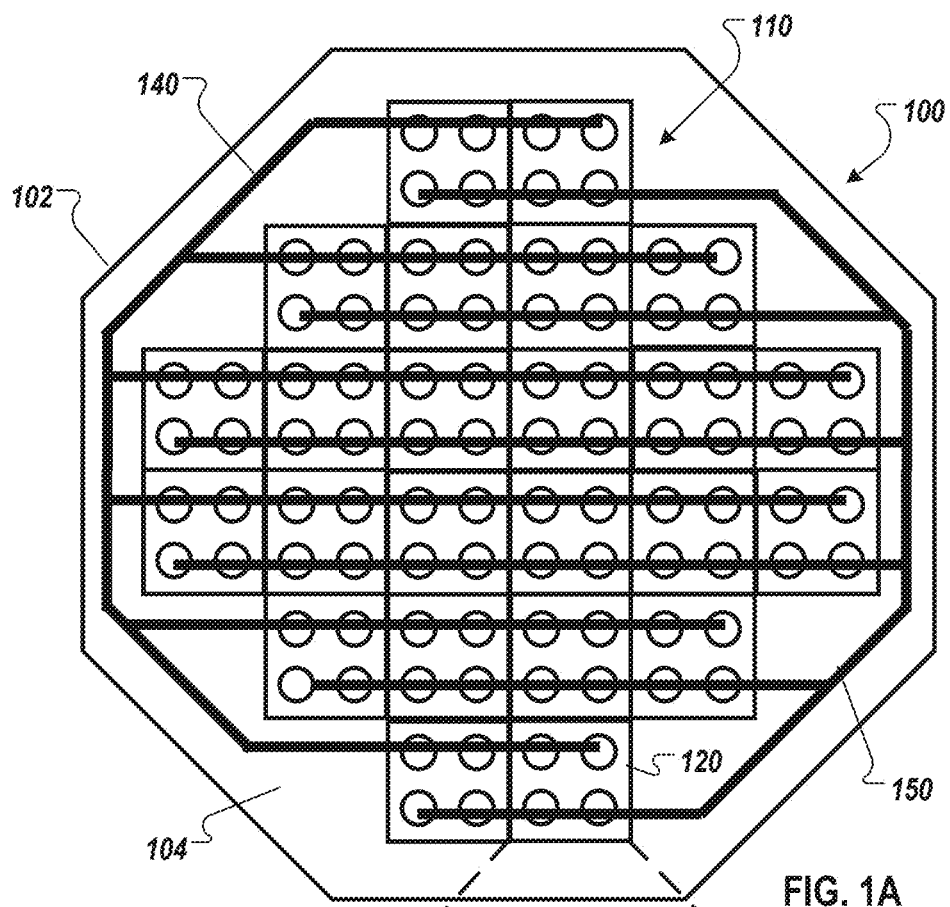
FIG. 1A shows a top view or bottom view of an example fuel region of a nuclear reactor according to the present disclosure.
Figure 1B:
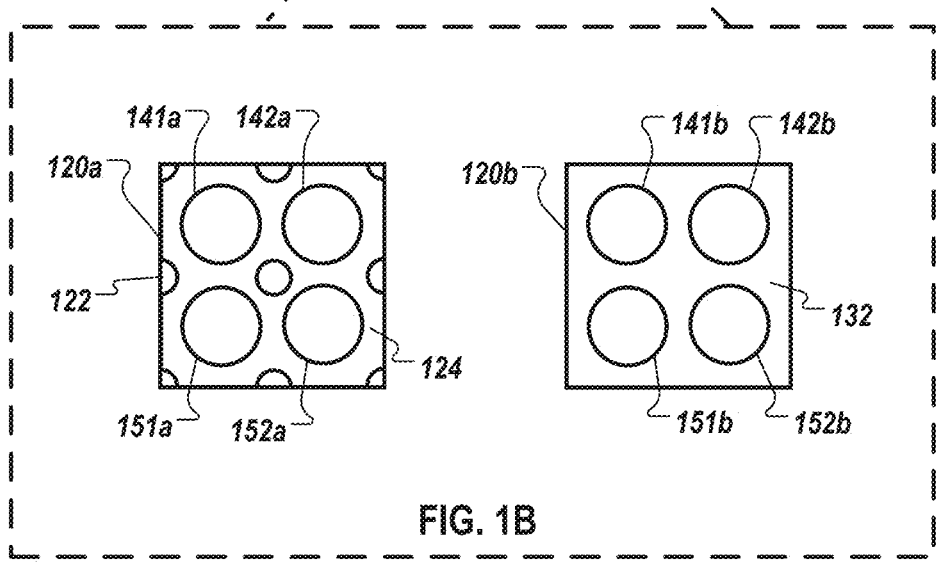
FIG. 1B shows example cross-sectional views of two possible configurations of a nuclear fuel element according to the present disclosure.

Global energy growth and a drive to reduce pollution and emissions is stimulating new activity around the commercialization and design of new reactor technologies. Some of these technologies include reactors designed to provide high reliability power that is long lasting and resilient in a more distributed fashion.

A nuclear reactor system includes fuel including a fissile material such as uranium-233, uranium-235, or plutonian-239; a coolant that uses a coolant to transport heat away from the fuel, a heat exchanger to transfer the heat from the coolant or cooling device to a power conversion system, as well as instrumentation, supporting structures and shielding. The fissile material can be contained in fuel elements, and the fuel elements can be held inside a reactor vessel. Coolant transfers heat from the fuel to a heat exchanger where the heat is transferred to an intermediate coolant or the power conversion working fluid. The coolant can operate on natural circulation. When operating on natural circulation, the coolant flows without a motive force being applied to the coolant. For example, natural circulation can cause the coolant to flow through piping in the absence of an operating pump.

Multiple heat exchangers can be used, each of which, or a combination of multiple can be used to transfer up to one hundred percent of the rated reactor power production. Rated reactor power is a maximum generation capacity of a nuclear reactor, and is typically measured in megawatts (MW). Thus, multiple independent power conversion pathways are provided that are each rated at one hundred percent rated reactor power.

An example reactor system operates with a fluid coolant (e.g., a liquid metal coolant such as liquid sodium or liquid lead), flowing by natural circulation driven by the difference in density between the coolant at its operating temperature in the core and the coolant at its operating temperature in the heat exchanger, combined with the elevation difference between the core and the heat exchanger.

During operation of the reactor system, primary coolant transfers heat from the fuel, and carries the heat to a heat exchanger where the heat is transferred to an intermediate coolant or to a power conversion working fluid. A primary coolant is a coolant that flows through the reactor core. Multiple heat exchangers can be used that are independently sized individually or in redundant sets to transfer heat at desired power levels up to one hundred percent of rated reactor power. The redundant heat exchanger systems can be part of redundant and independent power conversion systems.

In some implementations, the reactor's heat can be converted to usable heat or electricity via independent heat transport pathways. The reactor can be coupled to more than one turbine-generator system, each of which can operate at or near one hundred percent reactor power.

In some implementations, the independent heat transport and power conversion systems are operated such that only one is producing power while the others are on standby.

In some implementations, the independent heat transport and power conversion systems are operated such that more than one independent system is operated at reduced capacity such that the total output is at or near one hundred percent of rated power.

In some implementations, the system includes multiple heat exchangers configured to transfer heat from the liquid metal primary coolant to an intermediate coolant. In some implementations, the intermediate coolant includes the same fluid as the liquid metal coolant. In some implementations, the intermediate coolant is transported by natural circulation. In some implementations, the system includes one or more intermediate cooling loops housing the intermediate coolant. The one or more intermediate cooling loops can operate on natural circulation.

In some implementations, the system includes heat exchangers configured to transfer heat from the liquid metal coolant to a power conversion working fluid. The heat exchanger can be, for example, a low pressure drop heat exchanger. In some implementations, the one or more heat exchangers are each rated to independently transfer at least one hundred percent of reactor power. In some implementations, multiple independent intermediate coolant loops are configured to transfer heat to independent power conversion systems. In some implementations, one independent intermediate coolant loop is configured to transfer heat to multiple independent power conversion systems.

FIG. 1A shows a top view or bottom view of an example fuel region of a nuclear reactor 100. FIG. 1A depicts cooling trains that are fluidly connected to cooling channels of fuel elements. The top and bottom view of the nuclear reactor 100 may be the same, with a single cooling train being fluidly connected to the top and bottom of the same cooling channel.

Referring to FIG. 1A, nuclear reactor 100 includes a reactor vessel 102 that houses a reflector 104 and a reactor core 110 including fuel elements. The fuel elements make up the reactor core of the nuclear reactor 100. Nuclear reactor 100 is cooled by two cooling systems, or cooling trains, including cooling train 140 and cooling train 150. Although shown as being cooled by two cooling trains, the nuclear reactor 100 can be cooled by additional cooling trains, e.g., three cooling trains, four cooling trains, five cooling trains, or more.

The cooling trains 140, 150 are fluidly isolated from each other, such that coolant (e.g., liquid, gas, mixed phase fluid) from the cooling train 140 does not mix with coolant from the cooling train 150, and coolant does not flow between the cooling train 140 and the cooling train 150. The cooling trains 140, 150 operate in parallel to each other.

During operation, the cooling trains 140, 150 can be independently operated. In some examples, both cooling trains 140, 150 are in operation, such that coolant flows through both of the cooling trains 140, 150. In some examples, cooling train 140 can be in operation, while cooling train 150 is in standby, such that coolant only flows through cooling train 140. In some examples, cooling train 150 can be in operation, while cooling train 140 is in standby, such that coolant only flows through cooling train 150.

Each of the cooling trains 140, 150 can transport coolant through each fuel element of the reactor core 110. For example, the cooling train 140 can transport coolant through a first half of the cooling channels of a fuel element, and the cooling train 150 can transport coolant through a second half of the cooling channels of the fuel element.

An example fuel element of the reactor core 110 is fuel element 120. FIG. 113 shows example cross-sectional views of two possible configurations of the nuclear fuel element 120. The fuel element 120 has a rectangular prismic shape. In some examples, the fuel element 120 can have a cylindrical shape. The fuel element 120 can be formed from materials having high thermal conductivity, can have low power densities, or both.

In some examples, the fuel elements 120 have thermal conductivities of 5 W/m-K or greater (e.g., 8 W/m-K or greater, 10 W/m-K or greater 20 W/m-K or greater, 30 W/m-k or greater). The high thermal conductivity of the fuel elements 120 can enhance heat transfer from fuel to coolant and can enable the nuclear fuel to be cooled when the nuclear reactor 100 operates with flow passing through fewer than all cooling channels. For example, in some operating modes, coolant may flow through the cooling channels that are fluidly coupled to cooling train 140, and might not flow through the cooling channels that are fluidly coupled to cooling train 150. The nuclear reactor 100 can operate at power levels at or near one hundred percent of rated capacity, even with the reduced coolant flow, due to the high thermal conductivity of the materials that compose the fuel elements 120. Power levels at or near one hundred percent of rated capacity can include power levels within ten percent (e.g., within five percent, within three percent, within two percent, within one percent) of rated reactor power.

The low power densities of the fuel elements 120 can reduce fuel temperature and enable the nuclear fuel to be cooled when the nuclear reactor 100 operates with flow passing through fewer than all cooling channels. The nuclear reactor 100 can operate at power levels at or near one hundred percent, even with the reduced coolant flow, due to the lower power densities of the fuel elements 120.

Fuel element 120a includes cooling channels 141a and 142a for cooling train 140, and cooling channels 151a and 152a for cooling train 150. The cooling channels 141a and 142a transport coolant from cooling; train 140, while the cooling channels 151a and 152a transport coolant from cooling train 150. Fuel element 120a also includes graphite filler 124 and fuel pins 122. The cooling channels 141a, 142a, 151a, and 152a pass through the graphite filler of fuel element 120a.

Fuel element 120b includes cooling channels 141b and 142b for cooling train 140, and cooling channels 151b and 152b for cooling train 150. The cooling channels 141b and 142b transport coolant from cooling train 140, while the cooling channels 151b and 152b transport coolant from cooling train 150. Fuel element 120b also includes a fuel matrix, or fuel meat 132.

The cooling channels 141b, 142b, 151b, and 152b pass through the fuel meat 132 of fuel element 120b. The fuel meat 132 can include a mixture of nuclear fuel material and moderating material. The fuel meat 132 can include a metallic material.

In some examples, the cooling channels 141b, 142b, 151b, and 152b each have a cylindrical shape. Cylindrical axes of the cooling channels can extend parallel to each other. For example, a cylindrical axis of cooling channel 141b can be parallel to the cylindrical axis of cooling channel 142b.

In some implementations, coolant from the cooling train 140 enters cooling channels 141b, 142b of the fuel element 120 at a top of the fuel element, and flows downward through the fuel element 120, e.g., in the direction of gravity. Coolant exits the cooling channels 141b, 142b of the fuel element 120 at a bottom of the fuel element 120, and returns to the cooling train 140. Similarly, coolant from the cooling train 150 enters cooling channels 151b, 152b of the fuel element 120 at the top of the fuel element, and flows downward through the fuel element 120. Coolant exits the cooling; channels 151b, 152b of the fuel element 120 at the bottom of the fuel element 120, and returns to the cooling train 150. Thus, fluid flow through the cooling channels 141b, 142b, 151b, and 152b can be in a parallel, uniform direction, e.g., downward in the direction of gravity.

In some implementations, coolant from the cooling train 140 enters cooling channels 141b, 142b of the fuel element 120 at a bottom of the fuel element, and flows upward through the fuel element 120, e.g., against the direction of gravity. Coolant exits the cooling channels 141b, 142b of the fuel element 120 at a top of the fuel element 120, and returns to the cooling train 140. Similarly, coolant from the cooling train 150 enters cooling channels 151b, 152b of the fuel element 120 at the bottom of the fuel element 120, and flows upward through the fuel element 120. Coolant exits the cooling channels 151b, 152b of the fuel element 120 at the top of the fuel element 120, and returns to the cooling train 150. Thus, fluid flow through the cooling; channels 141b, 142b, 151b, and 152b can be in a parallel, uniform direction, e.g., upward against the direction of gravity.

In some implementations, fluid flow through the cooling channels 141b, 142b, 151b, and 152b can be in a non-uniform direction. For example, coolant can enter the cooling channels 141b, 142b from the cooling train 140 at the top of the fuel element 120, and can enter the cooling channels 151b, 152b from the cooling train 150 at the bottom of the fuel element 120. Thus, fluid coolant flow through the cooling channels 141b, 142b can be in a parallel, opposite direction from the direction of fluid coolant flow through the cooling channels 151b, 152b.

Although shown as having four cooling channels 141b, 142b, 151b, and 152b, the fuel element 120 can include more or fewer cooling channels. For example, the fuel element 120 can include two cooling; channels, with each of two cooling trains being fluidly coupled to one of the cooling channels. In some examples, the fuel element 120 can include six cooling channels, with each of two cooling trains being fluidly coupled to three of the cooling channels, or with each of three cooling trains being fluidly coupled to two of the cooling channels. Other combinations of cooling trains and cooling channels are possible (e.g., three cooling trains and three cooling channels per fuel element; four cooling trains and four cooling channels per fuel element; two cooling trains and eight cooling channels per fuel element).

Figure 2:
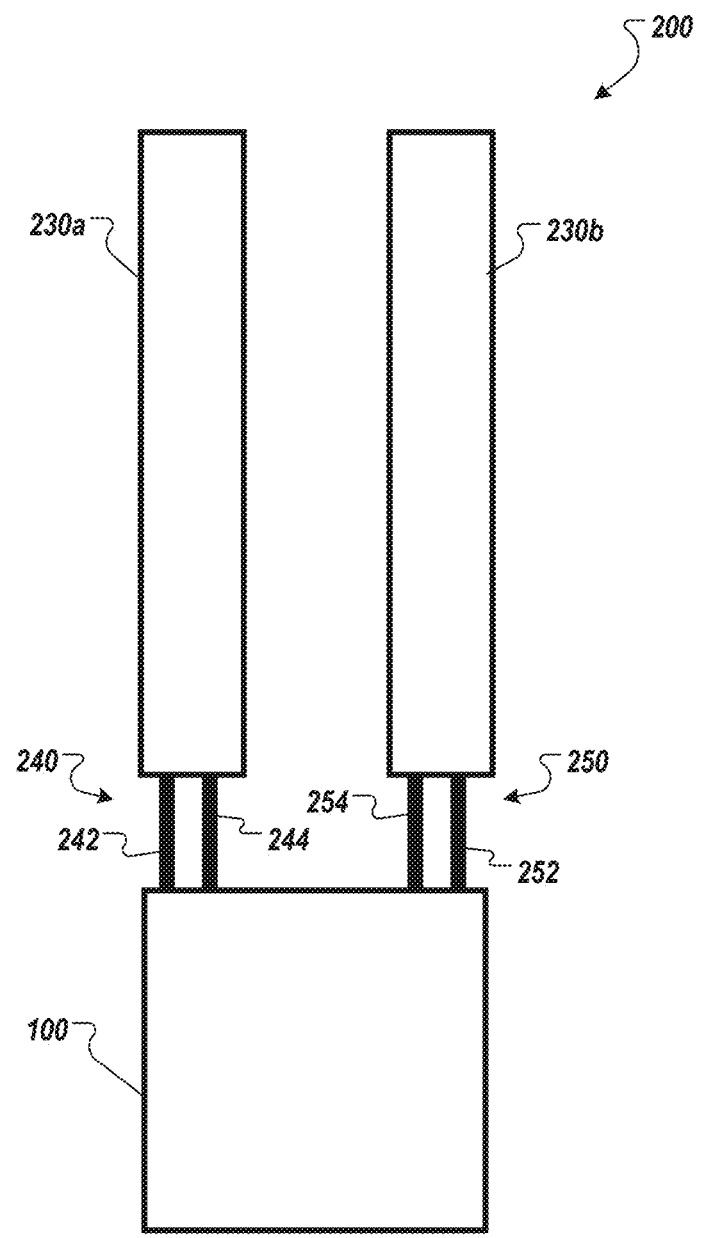
FIG. 2 is a schematic diagram of a reactor power system according to the present disclosure.

FIG. 2 is a schematic diagram of a reactor power system 200. The system 200 includes nuclear reactor 100 and power conversion trains 230a and 230b. The power conversion trains 230a and 230b are independent power conversion trains. The power conversion trains 230a and 230b are driven by heat from the nuclear reactor 100. Heat is transported from the nuclear reactor 100 to the power conversion trains 230a and 230b by cooling loops 240 and 250, respectively. Coolant can be transported by the cooling loops 240 using natural circulation or forced circulation.

The cooling loops 240 and 250 are fluidly isolated from each other and operate in parallel with each other. The cooling loop 240 includes a hot leg 242 for transporting hot coolant to the power conversion train 230a, and a cold leg 244 for transporting cold coolant to the nuclear reactor 100. The cooling loop 250 includes a hot leg 252 for transporting hot coolant to the power conversion train 230b, and a cold leg 254 for transporting cold coolant to the nuclear reactor 100.

In some examples, the cooling loops 240 and 250 transport primary coolant. For example, the cooling loops 240 and 250 can include the cooling trains 140 and 150 of FIG. 1A. In this example, the primary coolant from the cooling train 140 flows from the nuclear reactor 100 to the power conversion train 230a through the cooling loop 240, and the primary coolant from the cooling train 150 flows from the nuclear reactor 100 to the power conversion train 230b through the cooling loop 250.

In some examples, the cooling loops 240 and 250 can transport an intermediate coolant. For example, the cooling train 140 can be cooled by intermediate coolant in the cooling loop 240, and the cooling train 150 can be cooled by intermediate coolant in the coolant loop 250. In some examples, the nuclear reactor 100 includes a single primary cooling train, and the cooling loops 240 and 250 each are configured to remove heat from the single primary cooling train.

Figure 3A:
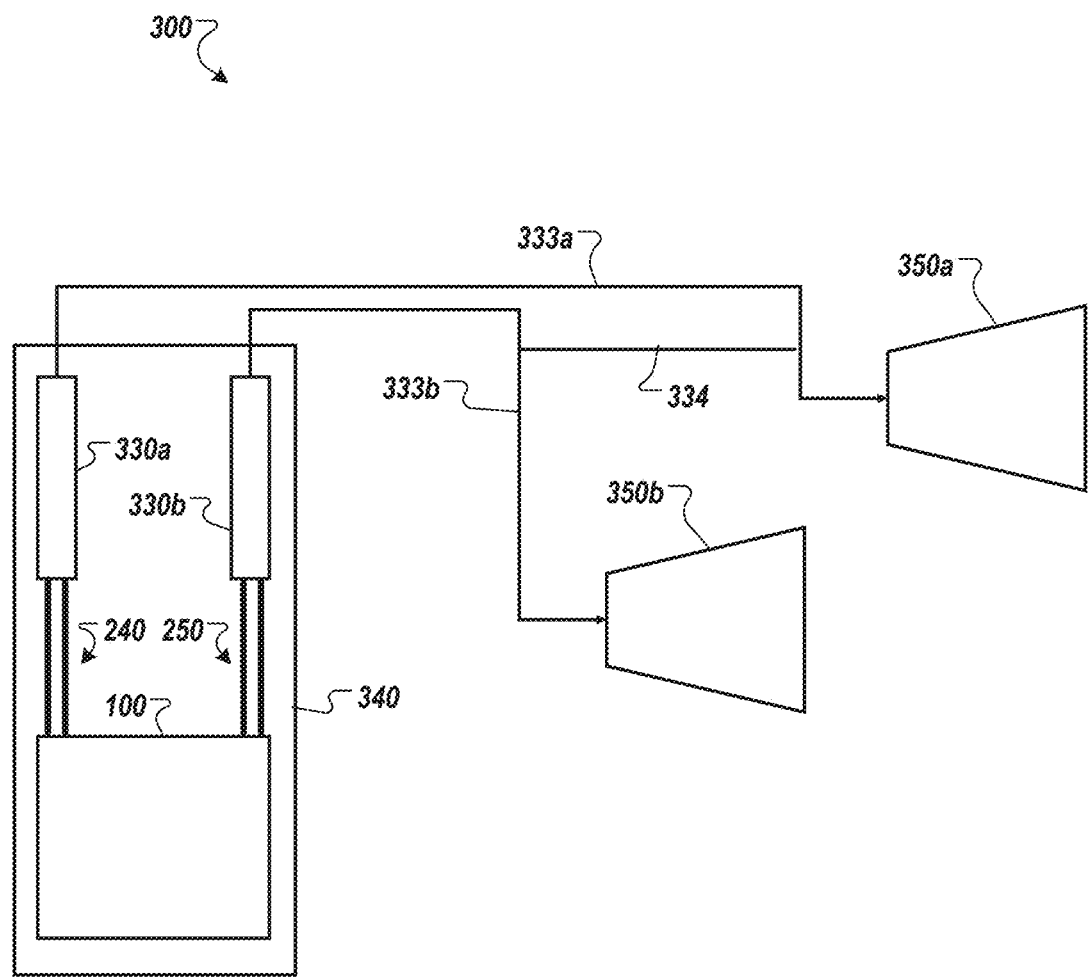
FIGS. 3A and 3B are schematic diagrams of a reactor power system and power conversion systems according to the present disclosure.
Figure 3B:
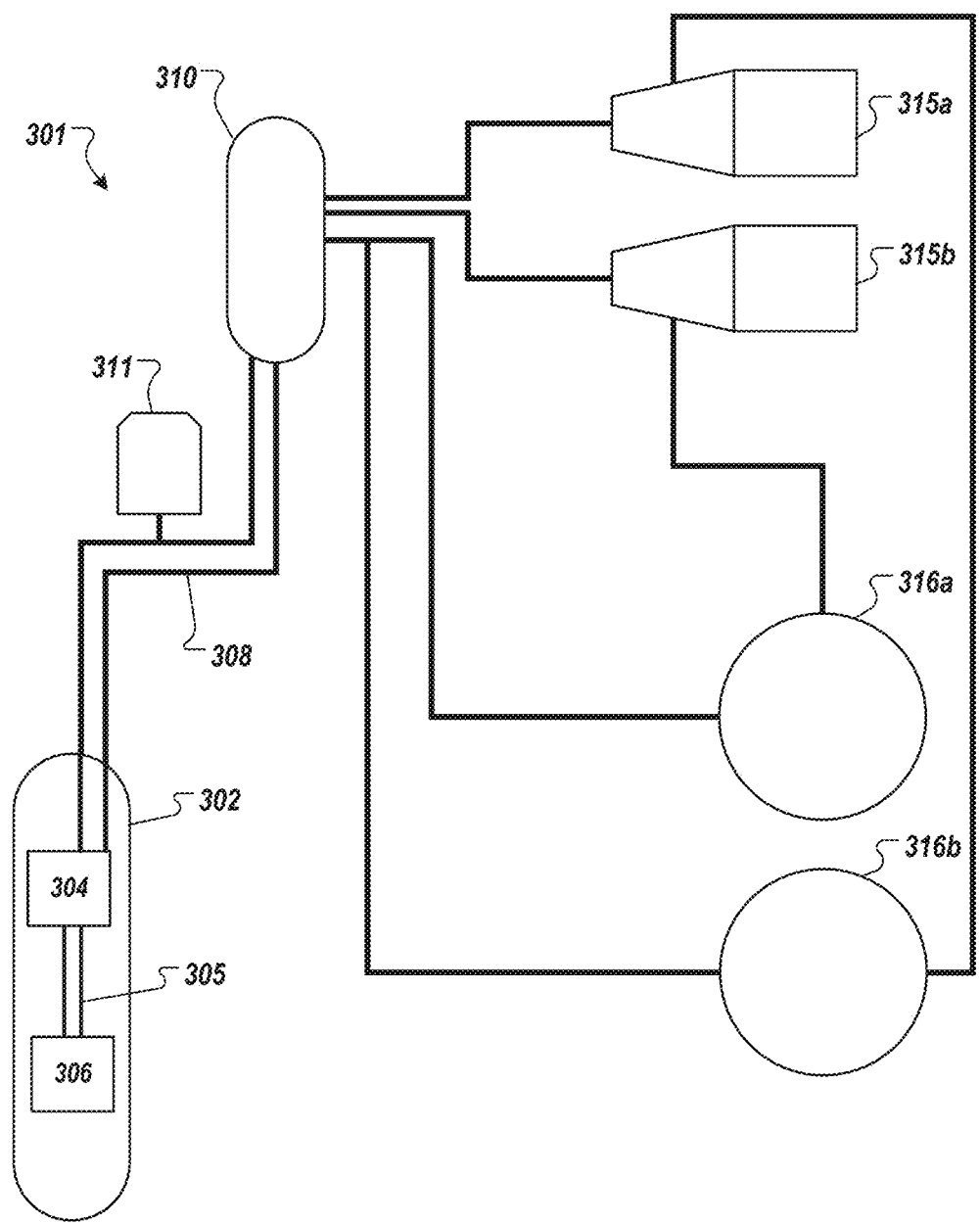

FIGS. 3A and 3B are schematic diagrams of systems including a reactor power system and multiple power conversion systems. Referring to FIG. 3A, the system 300 includes the nuclear reactor 100, cooling loops 240 and 250, and heat exchangers 330a, 330b. The heat exchangers 330a and 330b transfer heat from the cooling loops 240 and 250, respectively, to a power conversion working fluid. The nuclear reactor 100, cooling loops 240 and 250, and heat exchangers 330a and 330b are located in a containment 340.

Power conversion working fluid is transported from the heat exchanger 330a to a turbine 350a through a piping system 333a. Power conversion working fluid is also transported from the heat exchanger 330b to a turbine 350b through a piping system 333b In some examples, the heat exchanger 330a and the turbine 350a are part of a first power conversion train, e.g., power conversion train 230a of FIG. 2. In this example, the heat exchanger 330b and the turbine 350b are pail of a second power conversion train, e.g., power conversion train 230b of FIG. 2.

In some examples, the heat exchangers 330a and 330b are cooled by a single intermediate cooling loop. For example, an intermediate cooling loop can transport heat from primary coolant in the nuclear reactor 100 to both of the heat exchangers 330a and 330b. In this example, the nuclear reactor 100 can be cooled by a single primary cooling train or by multiple primary cooling trains that transfer heat to the single intermediate cooling loop.

In some examples, a bypass 334 connects the piping system 333a to the piping system 333b. The bypass 334 can be implemented such that power conversion working fluid from the heat exchanger 330a can flow through the bypass 334 to power the turbine 350b, and/or power conversion working fluid from the heat exchanger 330b can flow through the bypass 334 to power the turbine 350a. In this way, heat from either the first cooling system or the second cooling system can be used to power both of the turbines 350a, 350b.

Referring to FIG. 3B, the system 301 includes a reactor module 302 including a reactor core 306, primary coolant system 305, and an intermediate heat exchanger 304. The heat exchanger 304 is cooled by a single intermediate cooling loop 308. The intermediate cooling loop 308 transports heat from the primary coolant system 305 to a power conversion heat exchanger 310. The system 301 also includes power conversion systems 315a and 315b, and heat sinks 316a and 316b.

In some examples, intermediate coolant flows through the intermediate cooling loop 308 by natural circulation. In some examples, intermediate coolant is propelled through the intermediate cooling loop 308 by a motive force provided by one or more pumps. Redundant pumps can be included in the intermediate loop to provide forced circulation. The redundant pumps provide enhanced reliability of the intermediate system such that it is fault tolerant to one pump going offline.

The intermediate loop can be designed to include thermal energy storage via heat storage media, including structures and/or coolants, to allow for continued electricity generation in the event of a reactor shutdown. The thermal energy storage can also enable power peaking using the combined capacity of the power conversion systems. For example, the system 301 includes a thermal energy storage 311.

In some examples, the intermediate coolant is a liquid metal. The intermediate coolant system can be sized to store significant amounts of thermal energy to be used to support increased power production above one hundred percent rated reactor power by including increased mass of coolant, and/or through use of solid or phase change thermal storage media in storage tanks that are fluidly connected to the intermediate coolant loop.

FIGS. 4A to 4D are diagrams of example configurations of reactor power systems and power conversion systems. Referring to FIG. 4A, a reactor 410a provides heat to a first power conversion train 401a and to a second power conversion train 402a through two cooling loops 412.

Referring to FIG. 4B, a first reactor 410b provides heat to a first power conversion train 401b and to a second power conversion train 402b through two cooling loops 414, and a second reactor 420b provides heat to a third power conversion train 403b and to a fourth power conversion train 404b through two cooling loops 416.

Referring to FIG. 4C, a first reactor 410c provides heat to a first power conversion train 401c and to a third power conversion train 403c, a second reactor 420c provides heat to the first power conversion train 401c and to a second power conversion train 402c, and a third reactor 430c provides heat to the second power conversion train 402c and to the third power conversion train 403c through shared cooling loops 418.

Referring to FIG. 4D, a first reactor 410d provides heat to a first power conversion train 401d and to a second power conversion train 402d, and a second reactor 420d provides heat to the second power conversion train 402d and to a third power conversion train 403d, through partially shared cooling loops 422.

Using the disclosed techniques, the reactor power system can achieve a high operating up time by incorporating redundancy such that the reactor power system can continue to operate at full power, even with one or more power conversion systems offline.

In some examples, the reactor power system operates in a first operating mode in which multiple power conversion trains are each operating at power levels corresponding to greater than zero percent of rated reactor power but less than one hundred percent of rated reactor power. The combined power output of the reactor can be up to one hundred percent of rated reactor power.

The reactor power system can also operate in a second operating mode in which one power conversion train is operating at a power level corresponding to one hundred percent of rated reactor power, and the other power conversion trains are in standby. The nuclear reactor system can quickly switch between operating in the first operating mode and operating in the second operating mode. For example, with two power conversion trains operating in a "hot" mode, the system can switch from operating two power conversion trains to operating a single conversion train without performing a startup from a cold or zero power condition. This also allows for reduced complexity power management systems. The rotating inertia of an operating turbine can pick up load quickly, while reducing the likelihood of major voltage disruptions.

In some implementations, a decay heat removal auxiliary cooling system is used to passively remove decay heat from the reactor vessel. In some implementations, external cooling can remove heat from the reactor vessel system via a fluid, such as air, or a liquid.

In some implementations, the primary coolant is transported by natural circulation, transferring heat by natural convection. The primary coolant can flow via natural circulation at steady state conditions ranging in power levels spanning from reactor startup to full power. The primary coolant can include, for example, water, liquid metal, liquid salt, a supercritical fluid, or gas.

In some implementations, primary heat transport is accomplished using heat pipes. According to some embodiments, one or more booster pumps are used to facilitate reactor startup by establishing flow patterns via forced and mixed circulation, which then transitions to natural circulation at desired power levels. The booster pumps can be shut down once natural circulation is established.

Maintaining sufficient coolant chemistry and purity control is important to ensuring coolant and component longevity. In some implementations, a passive coolant chemistry control system is used that is sized to allow for minimal to maintenance over the plant operative lifetime. In some implementations, the system includes a passively operated cold trap configured to purify the liquid metal coolant.

In some implementations, during operation, the liquid metal coolant flows through the reactor by natural circulation. The liquid metal coolant can flow by natural circulation at steady-state conditions at power levels ranging from reactor startup to full power. In some implementations, the system includes a booster pump configured to pump the liquid metal coolant through the reactor.

In an example implementation, a nuclear power reactor vessel system includes an inner vessel that defines an inner volume sized to at least partially enclose a reactor cooled by a primary coolant such as a liquid metal coolant, and an outer vessel sized to wholly or substantially enclose the inner vessel. The reactor includes a plurality of nuclear fuel elements. In some examples, at least some of the nuclear fuel elements are at least partially enclosed within a cladding.

In some examples, the immersing fluid cools components of the system. The immersing fluid stores thermal energy generated by the reactor. In some examples, the immersing fluid is the same fluid as the liquid metal coolant. In some examples, the immersing fluid and the liquid metal coolant are fluidly or hydraulically connected. The immersing fluid and the liquid metal coolant can be fluidly connected by one of a flow diode, a pressure gate, a permeable membrane, or a height difference. In some examples, the system includes a modular package of reactor vessel components. The modular package can be removable from the system.

In some examples, the reactor power system includes a mass spectrometer detector to detect failed fuel pins. Typically, gamma spectrometers are used to detect fission products. A mass spectrometer can be positioned in the cover gas plenum outside of the active core of a reactor. This system can be used to detect fission gasses and or pre-filled fuel pin tag gasses. The presence of these materials in the cover gas plenum is likely to arise from failed or leaking fuel pins, since the gases are not otherwise present and there is no other source of the gases. Multiple mass spectrometers can be used to ensure redundancy and duplication, as well as the ability to confirm detection of off-normal gasses with coincidences of more than one positive signal. The spectrometers can be part of an overall reactor instrumentation and control system, and can be used to determine if a failed fuel element should be replaced.

The mass spectrometer detector can be positioned, for example, in the cover gas region of a liquid metal cooled reactor. The mass spectrometer detector can also be positioned in a gas cooled reactor, or molten salt reactor where a cover gas region or gas plenum is present. The mass spectrometer can also be located in the coolant chemistry and control system where the mass spectrometer can detect fission products indicating fuel pin failure.

Figures 5A, 5B:
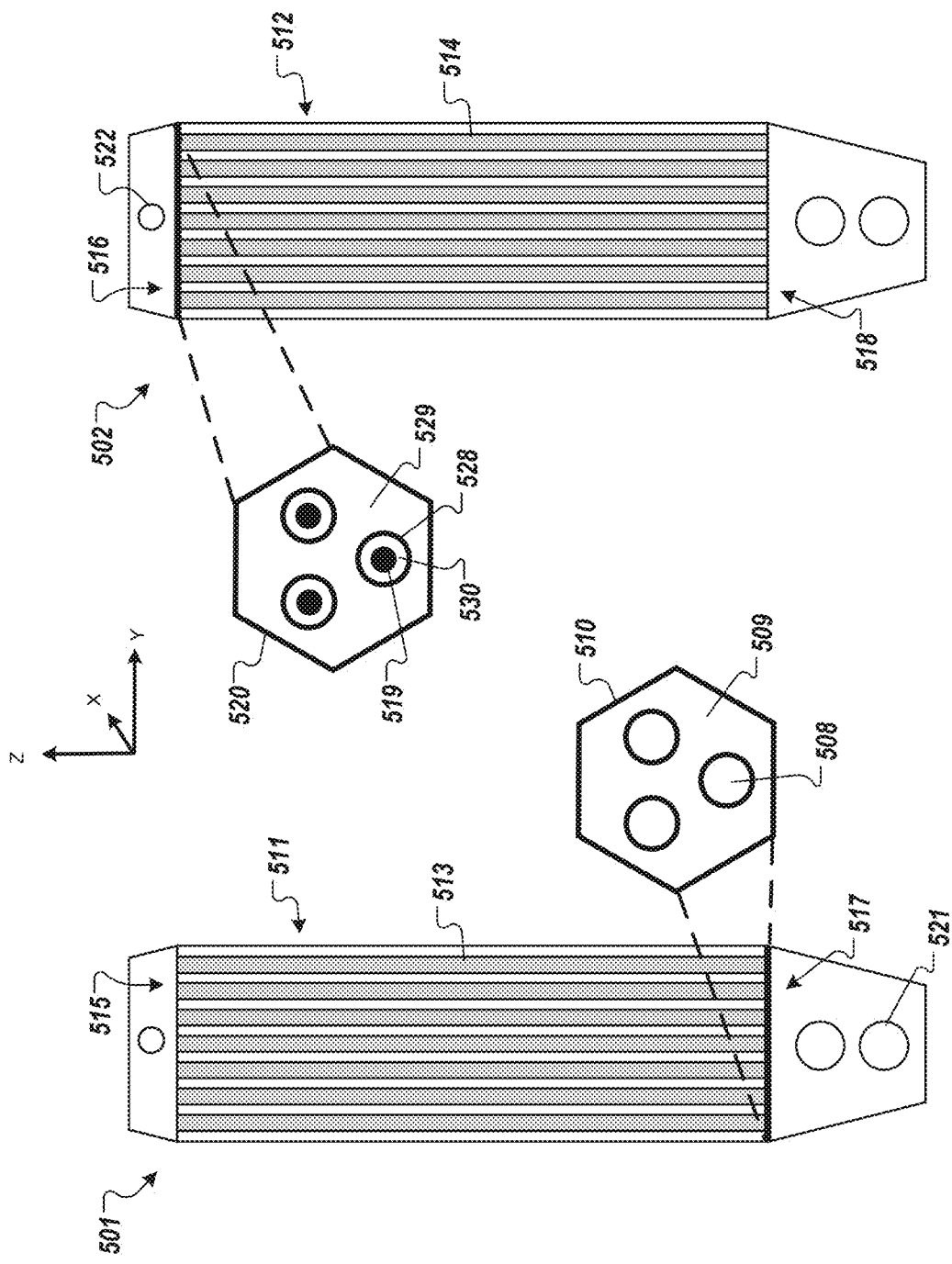
FIGS. 5A and 5B show example reactor cores including passive flow orifice devices.

FIGS. 5A and 5B show, example reactor cores 501, 502 including passive flow orifice devices, or orifice plates. The passive flow orifice plates can be positioned at the top end of a fuel assembly region, at a bottom end of a fuel assembly region, or at both the top and bottom ends of the reactor fuel assembly region.

The reactor core 501 includes a coolant inlet 521. The reactor core 501 includes a fuel assembly region 511 including multiple fuel elements, or fuel pins 513. The fuel assembly region 511 has a top end 515 and a bottom end 517. In some examples, the top end 515 is located above the bottom end 517 in the direction of gravity, e.g., the z-direction. Each fuel pin 513 has a length in the z-direction.

The reactor core 501 includes a passive flow orifice device 510 at the bottom end 517 of the fuel assembly region 511. The passive flow orifice device 510 includes flow orifices 508 and a passive thermal expansion orifice plate 509. Although shown as having three orifices 508, the plate 509 can include more or fewer orifices 508.

The passive flow orifice device 510 is positioned between the coolant inlet 521 and the fuel assembly region 511. Fluid coolant enters the fuel assembly region 511 through the orifices of the plate 509. The passive flow orifice device 510 is positioned with a surface of the plate 509 extending in a direction perpendicular to the direction of the length of the fuel pins 513. For example, the fuel pins 513 extend in the z-direction, and the surface of the plate 509 extends in the x-y plane. The passive flow orifice device 510 can passively, automatically respond to temperature changes by expanding or contracting. The expansion and contraction of the passive flow orifice device 510 causes an increase or decrease in flow volume at the assembly level based on local power to flow ratios.

The reactor core 502 includes a coolant outlet 522. The reactor core 502 includes a fuel assembly region 512 including multiple fuel pins 514. The fuel assembly region 512 has a top end 516 and a bottom end 518. In some examples, the top end 516 is located above the bottom end 518 in the direction of gravity, e.g., the z-direction. Each fuel pin 514 has a length in the z-direction.

The reactor core 502 includes a passive flow orifice device 520 at the top end 516 of the fuel assembly region 512. The passive flow orifice device 520 includes flow orifices 528 and a passive thermal expansion orifice plate 529. The passive flow orifice device 520 includes discs 519 positioned in the orifices 528. An annulus 530 is formed between the orifice 528 and the disc 519. Expansion and contraction of the disc 519, the plate 529, or both, changes the cross-sectional area of the annulus 530. The changing size of the annulus 530 changes the flow volume of fluid coolant through the passive flow orifice device 520. The disc 519 can be suspended in the orifice 528 using wires or a suspension arm. The disc 519 can be centered in the orifice 528 such that coolant flow around the disc 519 is uniform in the radial direction.

The passive flow orifice device 520 is positioned between the fuel assembly region 512 and the coolant outlet 522. Fluid coolant exits the fuel assembly region 512 through the orifices 528 of the plate 529. The passive flow orifice device 520 can passively, automatically respond to temperature changes by expanding or contracting. The expansion and contraction of the passive flow orifice device 520 causes an increase or decrease in flow volume at the assembly level based on local power to flow ratios.

The passive flow orifice devices 510, 520 can each respond to either increased coolant temperature based on the element's fission power production, or can employ materials that lead to increased radiation heating based on reactions with photons and neutrons produced in that element. These can include small amounts of fissile material, boron, or high Z materials. The passive flow orifice devices 510, 520 can also be designed to respond to both temperature and radiation heating.

Passive flow orifices can mitigate the need for fixed, or difficult to move, flow orifices, and enable for easier fuel shuffling. The expanding and contracting passive flow orifice devices can adjust coolant flow rates over time throughout the life of the core, to accommodate changes in temperature and radioactivity. Thus, the passive flow orifice devices can remain in place for long periods of time during core life without being replaced, reducing the amount of maintenance required.

Flow orifices ensure flat fuel element coolant outlet temperature distributions which enhances reactor performance. The passive flow orifice device can use solid materials, or liquid or gas expanders that expand as they experience higher temperatures, increasing flow area, reducing pressure drop, and allowing more primary coolant flow to flow through the orifice device. Gases and liquid have favorable expansion characteristics which can compensate for their increased complexity. Responding to coolant temperature, radiation heating, or both, would couple temperature and power behavior with the desired orifice expansion behavior.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A nuclear reactor power system, comprising:
   a reactor core comprising a plurality of nuclear fuel elements, each of the plurality of nuclear fuel elements comprising:
   a first cooling channel passing through the nuclear fuel element; and
   a second cooling channel passing through the nuclear fuel element and fluidly isolated from the first cooling channel;
   a first cooling system configured to transport a first fluid coolant through the reactor core, the first cooling system fluidly connected to the first cooling channel of each nuclear fuel element; and
   a second cooling system configured to transport a second fluid coolant through the reactor core, the second cooling system fluidly connected to the second cooling channel of each nuclear fuel element, wherein:
   in a first mode of operation of the nuclear reactor power system, a first volume of first fluid coolant flows through the first cooling system, and a second volume of second fluid coolant flows through the second cooling system, and
   in a second mode of operation of the nuclear reactor power system, a first volume of first fluid coolant flows through the first cooling system, and a second volume of second fluid coolant does not flow through the second cooling system.

2. The nuclear reactor power system of claim 1, wherein the first cooling system is fluidly isolated from the second cooling system.

3. The nuclear reactor power system of claim 1, wherein the nuclear reactor power system is configured to operate at or near one hundred percent of rated reactor power during operation in both the first mode of operation and the second mode of operation.

4. The nuclear reactor power system of claim 1, wherein during operation in the first mode of operation, at least one of the first volume of first fluid coolant or the second volume of second fluid coolant is transported by natural circulation.

5. The nuclear reactor power system of claim 1, wherein during operation in the second mode of operation, the first volume of first fluid coolant is transported by natural circulation.

6. The nuclear reactor power system of claim 1, wherein during operation in the first mode of operation:
   the first volume of first fluid coolant flows from the first cooling system through the first cooling channel of each nuclear fuel element; and
   the second volume of first fluid coolant flows from the second cooling system through the second cooling channel of each nuclear fuel element.

7. The nuclear reactor power system of claim 1, wherein the first cooling channel and the second cooling channel each comprises a cylindrical shape, and a cylindrical axis of the first cooling channel is parallel to a cylindrical axis of the second cooling channel.

8. The nuclear reactor power system of claim 1, wherein a direction of first fluid coolant flow through the first cooling channel is the same as a direction of second fluid coolant flow through the second cooling channel.

9. The nuclear reactor power system of claim 1, comprising:
   a first heat exchanger configured to transfer heat from the first fluid coolant in the first cooling system to a first intermediate coolant of a first intermediate coolant loop; and
   a second heat exchanger configured to transfer heat from the second fluid coolant in the second cooling system to a second intermediate coolant of a second intermediate coolant loop.

10. The nuclear reactor power system of claim 9, wherein:
    the first intermediate coolant flows through the first intermediate coolant loop by natural circulation; and
    the second intermediate coolant flows through the second intermediate coolant loop by natural circulation.

11. The nuclear reactor power system of claim 1, comprising:
    a first heat exchanger configured to transfer heat from the first fluid coolant in the first cooling system to a first intermediate coolant of a first intermediate coolant loop; and
    a second heat exchanger configured to transfer heat from the second fluid coolant in the second cooling system to the first intermediate coolant of the first intermediate coolant loop.

12. The nuclear reactor power system of claim 9, wherein each of the first heat exchanger and the second heat exchanger is configured to transfer heat at levels corresponding to reactor power levels at or near one hundred percent of rated reactor power.

13. The nuclear reactor power system of claim 9, comprising:
    a third heat exchanger configured to transfer heat from the first intermediate coolant in the first intermediate coolant loop to a power conversion working fluid of a first power conversion system; and
    a fourth heat exchanger configured to transfer heat from the second intermediate coolant in the second intermediate coolant loop to a power conversion working fluid of a second power conversion system.

14. The nuclear reactor power system of claim 9, wherein at least one of the first intermediate coolant loop or the second intermediate coolant loop is configured to transfer heat to multiple power conversion systems.

15. The nuclear reactor power system of claim 13, wherein during operation, the first power conversion system and the second power conversion system each operates independently.

16. The nuclear reactor power system of claim 13, wherein:
the first power conversion system comprises a first turbine,
the second power conversion system comprises a second turbine, and
each of the first turbine and the second turbine is configured to operate at power levels corresponding to reactor power levels at or near one hundred percent of rated reactor power.

17. The nuclear reactor power system of claim 1, wherein each of the nuclear fuel elements further comprises:
a third cooling channel passing through the nuclear fuel element; and
a fourth cooling channel passing through the nuclear fuel element, wherein:
the first cooling system is fluidly connected to the third cooling channel of each nuclear fuel element; and
the second cooling system is fluidly connected to the fourth cooling channel of each nuclear fuel element.

18. The nuclear reactor power system of claim 17, wherein the third cooling channel and the fourth cooling channel each comprises a cylindrical shape, a cylindrical axis of the third cooling channel being parallel to a cylindrical axis of the fourth cooling channel.

19. The nuclear reactor power system of claim 17, wherein a direction of first fluid coolant flow through the third cooling channel is the same as a direction of second fluid coolant flow through the fourth cooling channel.

20. The nuclear reactor power system of claim 1, wherein each of the first fluid coolant and the second fluid coolant comprises at least one of water, liquid metal, liquid salt, supercritical fluid, or gas.

21. The nuclear reactor power system of claim 1, wherein the reactor core comprises a fuel assembly region that includes a plurality of nuclear fuel elements that are arranged in parallel and that extend from a first end of the fuel assembly region to a second end of the fuel assembly region, the nuclear reactor power system comprising:
a plate positioned adjacent to a first end of the fuel assembly region, the plate including one or more orifices configured to change in size to cause a change in a flow volume of a fluid coolant through the reactor core.

22. The nuclear reactor power system of claim 21, wherein:
the plate is positioned between a coolant inlet and the fuel assembly region; and
fluid coolant enters the fuel assembly region through the one or more orifices of the plate.

23. The nuclear reactor power system of claim 21, wherein:
the plate is positioned between a coolant outlet and the fuel assembly region; and
fluid coolant exits the fuel assembly region through the one or more orifices of the plate.

24. The nuclear reactor power system of claim 21, wherein the plate comprises a first plate, the system comprising a second plate positioned adjacent to the second end of the fuel assembly region.

25. The nuclear reactor power system of claim 21, wherein the plate is formed from at least one expandable material configured to expand or contract with changing temperatures.

26. The nuclear reactor power system of claim 21, wherein the plate is formed from at least one expandable material configured to expand or contract with changing radiation levels.

27. The nuclear reactor power system of claim 25, wherein expansion or contraction of the at least one expandable material causes the change in the size of the one or more orifices.

28. The nuclear reactor power system of claim 26, wherein expansion or contraction of the at least one expandable material causes the change in the size of the one or more orifices.

29. A nuclear reactor power system, comprising:
a reactor core comprising a plurality of nuclear fuel elements, each of the plurality of nuclear fuel elements comprising:
a first cooling channel passing through the nuclear fuel element; and
a second cooling channel passing through the nuclear fuel element and fluidly isolated from the first cooling channel;
a first cooling system configured to transport a first fluid coolant through the reactor core, the first cooling system fluidly connected to the first cooling channel of each nuclear fuel element;
a second cooling system configured to transport a second fluid coolant through the reactor core, the second cooling system fluidly connected to the second cooling channel of each nuclear fuel element;
a first heat exchanger configured to transfer heat from the first fluid coolant in the first cooling system to a first intermediate coolant of a first intermediate coolant loop; and
a second heat exchanger configured to transfer heat from the second fluid coolant in the second cooling system to a second intermediate coolant of a second intermediate coolant loop, wherein:
the first intermediate coolant flows through the first intermediate coolant loop by natural circulation; and
the second intermediate coolant flows through the second intermediate coolant loop by natural circulation.

30. The nuclear reactor power system of claim 29, wherein the first cooling system is fluidly isolated from the second cooling system.

31. The nuclear reactor power system of claim 29, wherein:
in a first mode of operation of the nuclear reactor power system, a first volume of first fluid coolant flows through the first cooling system, and a second volume of second fluid coolant flows through the second cooling system, and
in a second mode of operation of the nuclear reactor power system, a first volume of first fluid coolant flows through the first cooling system, and a second volume of second fluid coolant does not flow through the second cooling system.

32. The nuclear reactor power system of claim 31, wherein the nuclear reactor power system is configured to operate at or near one hundred percent of rated reactor power during operation in both the first mode of operation and the second mode of operation.

33. The nuclear reactor power system of claim 31, wherein during operation in the first mode of operation, at least one of the first volume of first fluid coolant or the second volume of second fluid coolant is transported by natural circulation.

34. The nuclear reactor power system of claim 31, wherein during operation in the second mode of operation, the first volume of first fluid coolant is transported by natural circulation.

35. The nuclear reactor power system of claim 31, wherein during operation in the first mode of operation:
the first volume of first fluid coolant flows from the first cooling system through the first cooling channel of each nuclear fuel element; and
the second volume of first fluid coolant flows from the second cooling system through the second cooling channel of each nuclear fuel element.

36. The nuclear reactor power system of claim 31, wherein the first cooling channel and the second cooling channel each comprises a cylindrical shape, and a cylindrical axis of the first cooling channel is parallel to a cylindrical axis of the second cooling channel.

37. The nuclear reactor power system of claim 29, wherein a direction of first fluid coolant flow through the first cooling channel is the same as a direction of second fluid coolant flow through the second cooling channel.

38. The nuclear reactor power system of claim 29, wherein the first fluid coolant comprises at least one of water, liquid metal, liquid salt, supercritical fluid, or gas.

39. The nuclear reactor power system of claim 29, comprising:
a first heat exchanger configured to transfer heat from the first fluid coolant in the first cooling system to a first intermediate coolant of a first intermediate coolant loop; and
a second heat exchanger configured to transfer heat from the second fluid coolant in the second cooling system to the first intermediate coolant of the first intermediate coolant loop, wherein each of the first heat exchanger and the second heat exchanger is configured to transfer heat at levels corresponding to reactor power levels at or near one hundred percent of rated reactor power.

40. The nuclear reactor power system of claim 39, comprising:
a third heat exchanger configured to transfer heat from the first intermediate coolant in the first intermediate coolant loop to a power conversion working fluid of a first power conversion system; and
a fourth heat exchanger configured to transfer heat from the second intermediate coolant in the second intermediate coolant loop to a power conversion working fluid of a second power conversion system, wherein at least one of the first intermediate coolant loop or the second intermediate coolant loop is configured to transfer heat to multiple power conversion systems.

41. The nuclear reactor power system of claim 40, wherein during operation, the first power conversion system and the second power conversion system each operates independently.

42. The nuclear reactor power system of claim 40, wherein:
the first power conversion system comprises a first turbine,
the second power conversion system comprises a second turbine, and
each of the first turbine and the second turbine is configured to operate at power levels corresponding to reactor power levels at or near one hundred percent of rated reactor power.

43. The nuclear reactor power system of claim 29, wherein each of the nuclear fuel elements further comprises:
a third cooling channel passing through the nuclear fuel element; and
a fourth cooling channel passing through the nuclear fuel element, wherein:
the first cooling system is fluidly connected to the third cooling channel of each nuclear fuel element; and
the second cooling system is fluidly connected to the fourth cooling channel of each nuclear fuel element, wherein the third cooling channel and the fourth cooling channel each comprises a cylindrical shape, a cylindrical axis of the third cooling channel being parallel to a cylindrical axis of the fourth cooling channel.

44. The nuclear reactor power system of claim 43, wherein a direction of first fluid coolant flow through the third cooling channel is the same as a direction of second fluid coolant flow through the fourth cooling channel.

45. The nuclear reactor power system of claim 29, wherein the second fluid coolant comprises at least one of water, liquid metal, liquid salt, supercritical fluid, or gas.

46. The nuclear reactor power system of claim 29, wherein the reactor core comprises a fuel assembly region that includes a plurality of nuclear fuel elements that are arranged in parallel and that extend from a first end of the fuel assembly region to a second end of the fuel assembly region, the nuclear reactor power system comprising:
a plate positioned adjacent to a first end of the fuel assembly region, the plate including one or more orifices configured to change in size to cause a change in a flow volume of a fluid coolant through the reactor core.

47. The nuclear reactor power system of claim 46, wherein:
the plate is positioned between a coolant inlet and the fuel assembly region; and
fluid coolant enters the fuel assembly region through the one or more orifices of the plate.

48. The nuclear reactor power system of claim 46, wherein:
the plate is positioned between a coolant outlet and the fuel assembly region; and
fluid coolant exits the fuel assembly region through the one or more orifices of the plate.

49. The nuclear reactor power system of claim 46, wherein the plate comprises a first plate, the system comprising a second plate positioned adjacent to the second end of the fuel assembly region,
the plate is formed from at least one expandable material configured to expand or contract with: (i) changing temperatures, or (ii) changing radiation levels, and
expansion or contraction of the at least one expandable material causes the change in the size of the one or more orifices.

50. A nuclear reactor power system, comprising:
a reactor core comprising a plurality of nuclear fuel elements, each of the plurality of nuclear fuel elements comprising:
a first cooling channel passing through the nuclear fuel element; and
a second cooling channel passing through the nuclear fuel element and fluidly isolated from the first cooling channel;

a first cooling system configured to transport a first fluid coolant through the reactor core, the first cooling system fluidly connected to the first cooling channel of each nuclear fuel element;

a second cooling system configured to transport a second fluid coolant through the reactor core, the second cooling system fluidly connected to the second cooling channel of each nuclear fuel element;

a first heat exchanger configured to transfer heat from the first fluid coolant in the first cooling system to a first intermediate coolant of a first intermediate coolant loop; and a second heat exchanger configured to transfer heat from the second fluid coolant in the second cooling system to the first intermediate coolant of the first intermediate coolant loop.

51. The nuclear reactor power system of claim 50, wherein the first cooling system is fluidly isolated from the second cooling system.

52. The nuclear reactor power system of claim 50, wherein:
in a first mode of operation of the nuclear reactor power system, a first volume of first fluid coolant flows through the first cooling system, and a second volume of second fluid coolant flows through the second cooling system, and
in a second mode of operation of the nuclear reactor power system, a first volume of first fluid coolant flows through the first cooling system, and a second volume of second fluid coolant does not flow through the second cooling system.

53. The nuclear reactor power system of claim 52, wherein the nuclear reactor power system is configured to operate at or near one hundred percent of rated reactor power during operation in both the first mode of operation and the second mode of operation.

54. The nuclear reactor power system of claim 52, wherein during operation in the first mode of operation, at least one of the first volume of first fluid coolant or the second volume of second fluid coolant is transported by natural circulation, and during operation in the second mode of operation, the first volume of first fluid coolant is transported by natural circulation.

55. The nuclear reactor power system of claim 52, wherein during operation in the first mode of operation:
the first volume of first fluid coolant flows from the first cooling system through the first cooling channel of each nuclear fuel element; and
the second volume of first fluid coolant flows from the second cooling system through the second cooling channel of each nuclear fuel element.

56. The nuclear reactor power system of claim 52, wherein the first cooling channel and the second cooling channel each comprises a cylindrical shape, and a cylindrical axis of the first cooling channel is parallel to a cylindrical axis of the second cooling channel.

57. The nuclear reactor power system of claim 50, wherein a direction of first fluid coolant flow through the first cooling channel is the same as a direction of second fluid coolant flow through the second cooling channel.

58. The nuclear reactor power system of claim 50, comprising:
a first heat exchanger configured to transfer heat from the first fluid coolant in the first cooling system to a first intermediate coolant of a first intermediate coolant loop; and a second heat exchanger configured to transfer heat from the second fluid coolant in the second cooling system to a second intermediate coolant of a second intermediate coolant loop.

59. The nuclear reactor power system of claim 58, wherein:
the first intermediate coolant flows through the first intermediate coolant loop by natural circulation; and
the second intermediate coolant flows through the second intermediate coolant loop by natural circulation.

60. The nuclear reactor power system of claim 58, wherein each of the first heat exchanger and the second heat exchanger is configured to transfer heat at levels corresponding to reactor power levels at or near one hundred percent of rated reactor power.

61. The nuclear reactor power system of claim 58, comprising:
a third heat exchanger configured to transfer heat from the first intermediate coolant in the first intermediate coolant loop to a power conversion working fluid of a first power conversion system; and
a fourth heat exchanger configured to transfer heat from the second intermediate coolant in the second intermediate coolant loop to a power conversion working fluid of a second power conversion system.

62. The nuclear reactor power system of claim 58, wherein at least one of the first intermediate coolant loop or the second intermediate coolant loop is configured to transfer heat to multiple power conversion systems, and
during operation, the first power conversion system and the second power conversion system each operates independently.

63. The nuclear reactor power system of claim 62, wherein:
the first power conversion system comprises a first turbine,
the second power conversion system comprises a second turbine, and
each of the first turbine and the second turbine is configured to operate at power levels corresponding to reactor power levels at or near one hundred percent of rated reactor power.

64. The nuclear reactor power system of claim 50, wherein each of the nuclear fuel elements further comprises:
a third cooling channel passing through the nuclear fuel element; and
a fourth cooling channel passing through the nuclear fuel element, wherein:
the first cooling system is fluidly connected to the third cooling channel of each nuclear fuel element; and
the second cooling system is fluidly connected to the fourth cooling channel of each nuclear fuel element.

65. The nuclear reactor power system of claim 64, wherein the third cooling channel and the fourth cooling channel each comprises a cylindrical shape, a cylindrical axis of the third cooling channel being parallel to a cylindrical axis of the fourth cooling channel, and
a direction of first fluid coolant flow through the third cooling channel is the same as a direction of second fluid coolant flow through the fourth cooling channel.

66. The nuclear reactor power system of claim 50, wherein each of the first fluid coolant and the second fluid coolant comprises at least one of water, liquid metal, liquid salt, supercritical fluid, or gas.

67. The nuclear reactor power system of claim 50, wherein the reactor core comprises a fuel assembly region that includes a plurality of nuclear fuel elements that are arranged in parallel and that extend from a first end of the fuel assembly region to a second end of the fuel assembly region, the nuclear reactor power system comprising:
- a plate positioned adjacent to a first end of the fuel assembly region, the plate including one or more orifices configured to change in size to cause a change in a flow volume of a fluid coolant through the reactor core.

68. The nuclear reactor power system of claim 67, wherein:
- the plate is positioned between a coolant inlet and the fuel assembly region; and
- fluid coolant enters the fuel assembly region through the one or more orifices of the plate.

69. The nuclear reactor power system of claim 67, wherein:
- the plate is positioned between a coolant outlet and the fuel assembly region; and
- fluid coolant exits the fuel assembly region through the one or more orifices of the plate.

70. The nuclear reactor power system of claim 67, wherein the plate comprises a first plate, the system comprising a second plate positioned adjacent to the second end of the fuel assembly region.

71. The nuclear reactor power system of claim 67, wherein the plate is formed from at least one expandable material configured to expand or contract with changing temperatures, or the plate is formed from at least one expandable material configured to expand or contract with changing radiation levels.

72. The nuclear reactor power system of claim 71, wherein expansion or contraction of the at least one expandable material causes the change in the size of the one or more orifices.

73. A nuclear reactor power system, comprising:
- a reactor core comprising a plurality of nuclear fuel elements, each of the plurality of nuclear fuel elements comprising:
  - a first cooling channel passing through the nuclear fuel element; and
  - a second cooling channel passing through the nuclear fuel element and fluidly isolated from the first cooling channel;
- a first cooling system configured to transport a first fluid coolant through the reactor core, the first cooling system fluidly connected to the first cooling channel of each nuclear fuel element;
- a second cooling system configured to transport a second fluid coolant through the reactor core, the second cooling system fluidly connected to the second cooling channel of each nuclear fuel element;
- a first heat exchanger configured to transfer heat from the first fluid coolant in the first cooling system to a first intermediate coolant of a first intermediate coolant loop;
- a second heat exchanger configured to transfer heat from the second fluid coolant in the second cooling system to a second intermediate coolant of a second intermediate coolant loop;
- a third heat exchanger configured to transfer heat from the first intermediate coolant in the first intermediate coolant loop to a power conversion working fluid of a first power conversion system; and
- a fourth heat exchanger configured to transfer heat from the second intermediate coolant in the second intermediate coolant loop to a power conversion working fluid of a second power conversion system.

74. The nuclear reactor power system of claim 73, wherein the first cooling system is fluidly isolated from the second cooling system.

75. The nuclear reactor power system of claim 73, wherein:
- in a first mode of operation of the nuclear reactor power system, a first volume of first fluid coolant flows through the first cooling system, and a second volume of second fluid coolant flows through the second cooling system, and
- in a second mode of operation of the nuclear reactor power system, a first volume of first fluid coolant flows through the first cooling system, and a second volume of second fluid coolant does not flow through the second cooling system.

76. The nuclear reactor power system of claim 75, wherein the nuclear reactor power system is configured to operate at or near one hundred percent of rated reactor power during operation in both the first mode of operation and the second mode of operation.

77. The nuclear reactor power system of claim 75, wherein during operation in the first mode of operation, at least one of the first volume of first fluid coolant or the second volume of second fluid coolant is transported by natural circulation.

78. The nuclear reactor power system of claim 75, wherein during operation in the second mode of operation, the first volume of first fluid coolant is transported by natural circulation.

79. The nuclear reactor power system of claim 75, wherein during operation in the first mode of operation:
- the first volume of first fluid coolant flows from the first cooling system through the first cooling channel of each nuclear fuel element; and
- the second volume of first fluid coolant flows from the second cooling system through the second cooling channel of each nuclear fuel element.

80. The nuclear reactor power system of claim 75, wherein the first cooling channel and the second cooling channel each comprises a cylindrical shape, and a cylindrical axis of the first cooling channel is parallel to a cylindrical axis of the second cooling channel.

81. The nuclear reactor power system of claim 73, wherein a direction of first fluid coolant flow through the first cooling channel is the same as a direction of second fluid coolant flow through the second cooling channel.

82. The nuclear reactor power system of claim 73, comprising:
- a first heat exchanger configured to transfer heat from the first fluid coolant in the first cooling system to a first intermediate coolant of a first intermediate coolant loop; and
- a second heat exchanger configured to transfer heat from the second fluid coolant in the second cooling system to a second intermediate coolant of a second intermediate coolant loop.

83. The nuclear reactor power system of claim 82, wherein:
- the first intermediate coolant flows through the first intermediate coolant loop by natural circulation; and
- the second intermediate coolant flows through the second intermediate coolant loop by natural circulation.

84. The nuclear reactor power system of claim 73, wherein each of the first heat exchanger and the second heat exchanger is configured to transfer heat at levels corresponding to reactor power levels at or near one hundred percent of rated reactor power.

85. The nuclear reactor power system of claim 73, wherein at least one of the first intermediate coolant loop or the second intermediate coolant loop is configured to transfer heat to multiple power conversion systems, and
during operation, the first power conversion system and the second power conversion system each operates independently.

86. The nuclear reactor power system of claim 85, wherein:
the first power conversion system comprises a first turbine,
the second power conversion system comprises a second turbine, and
each of the first turbine and the second turbine is configured to operate at power levels corresponding to reactor power levels at or near one hundred percent of rated reactor power.

87. The nuclear reactor power system of claim 73, wherein each of the nuclear fuel elements further comprises:
a third cooling channel passing through the nuclear fuel element; and
a fourth cooling channel passing through the nuclear fuel element, wherein:
the first cooling system is fluidly connected to the third cooling channel of each nuclear fuel element; and
the second cooling system is fluidly connected to the fourth cooling channel of each nuclear fuel element.

88. The nuclear reactor power system of claim 87, wherein the third cooling channel and the fourth cooling channel each comprises a cylindrical shape, a cylindrical axis of the third cooling channel being parallel to a cylindrical axis of the fourth cooling channel.

89. The nuclear reactor power system of claim 87, wherein a direction of first fluid coolant flow through the third cooling channel is the same as a direction of second fluid coolant flow through the fourth cooling channel.

90. The nuclear reactor power system of claim 73, wherein each of the first fluid coolant and the second fluid coolant comprises at least one of water, liquid metal, liquid salt, supercritical fluid, or gas.

91. The nuclear reactor power system of claim 73, wherein the reactor core comprises a fuel assembly region that includes a plurality of nuclear fuel elements that are arranged in parallel and that extend from a first end of the fuel assembly region to a second end of the fuel assembly region, the nuclear reactor power system comprising:
a plate positioned adjacent to a first end of the fuel assembly region, the plate including one or more orifices configured to change in size to cause a change in a flow volume of a fluid coolant through the reactor core.

92. The nuclear reactor power system of claim 91, wherein:
the plate is positioned between a coolant inlet and the fuel assembly region; and
fluid coolant enters the fuel assembly region through the one or more orifices of the plate.

93. The nuclear reactor power system of claim 91, wherein:
the plate is positioned between a coolant outlet and the fuel assembly region; and
fluid coolant exits the fuel assembly region through the one or more orifices of the plate.

94. The nuclear reactor power system of claim 91, wherein the plate comprises a first plate, the system comprising a second plate positioned adjacent to the second end of the fuel assembly region.

95. The nuclear reactor power system of claim 91, wherein the plate is formed from at least one expandable material configured to expand or contract with changing temperatures, or the plate is formed from at least one expandable material configured to expand or contract with changing radiation levels.

96. The nuclear reactor power system of claim 95, wherein expansion or contraction of the at least one expandable material causes the change in the size of the one or more orifices.

97. A nuclear reactor power system, comprising:
a reactor core comprising a plurality of nuclear fuel elements, each of the plurality of nuclear fuel elements comprising:
a first cooling channel passing through the nuclear fuel element;
a second cooling channel passing through the nuclear fuel element and fluidly isolated from the first cooling channel;
a third cooling channel passing through the nuclear fuel element; and
a fourth cooling channel passing through the nuclear fuel element;
a first cooling system configured to transport a first fluid coolant through the reactor core, the first cooling system fluidly connected to the first cooling channel of each nuclear fuel element, and the first cooling system fluidly connected to the third cooling channel of each nuclear fuel element; and
a second cooling system configured to transport a second fluid coolant through the reactor core, the second cooling system fluidly connected to the second cooling channel of each nuclear fuel element, and the second cooling system fluidly connected to the fourth cooling channel of each nuclear fuel element.

98. The nuclear reactor power system of claim 97, wherein the first cooling system is fluidly isolated from the second cooling system.

99. The nuclear reactor power system of claim 97, wherein the nuclear reactor power system is configured to operate at or near one hundred percent of rated reactor power during operation in both a first mode of operation and a second mode of operation.

100. The nuclear reactor power system of claim 99, wherein during operation in the first mode of operation, at least one of a first volume of a first fluid coolant or a second volume of a second fluid coolant is transported by natural circulation.

101. The nuclear reactor power system of claim 100, wherein during operation in the second mode of operation, the first volume of the first fluid coolant is transported by natural circulation.

102. The nuclear reactor power system of claim 100, wherein during operation in the first mode of operation:
the first volume of the first fluid coolant flows from the first cooling system through the first cooling channel of each nuclear fuel element; and
the second volume of the second fluid coolant flows from the second cooling system through the second cooling channel of each nuclear fuel element.

103. The nuclear reactor power system of claim 97, wherein the first cooling channel and the second cooling channel each comprises a cylindrical shape, and a cylindrical axis of the first cooling channel is parallel to a cylindrical axis of the second cooling channel.

104. The nuclear reactor power system of claim 97, wherein a direction of first fluid coolant flow through the first cooling channel is the same as a direction of second fluid coolant flow through the second cooling channel.

105. The nuclear reactor power system of claim 97, comprising:
- a first heat exchanger configured to transfer heat from the first fluid coolant in the first cooling system to a first intermediate coolant of a first intermediate coolant loop; and
- a second heat exchanger configured to transfer heat from the second fluid coolant in the second cooling system to a second intermediate coolant of a second intermediate coolant loop.

106. The nuclear reactor power system of claim 105, wherein each of the first heat exchanger and the second heat exchanger is configured to transfer heat at levels corresponding to reactor power levels at or near one hundred percent of rated reactor power.

107. The nuclear reactor power system of claim 105, wherein at least one of the first intermediate coolant loop or the second intermediate coolant loop is configured to transfer heat to multiple power conversion systems.

108. The nuclear reactor power system of claim 97, comprising a first power conversion system and a second power conversion system, wherein during operation, the first power conversion system and the second power conversion system each operates independently.

109. The nuclear reactor power system of claim 108, wherein:
- the first power conversion system comprises a first turbine,
- the second power conversion system comprises a second turbine, and
- each of the first turbine and the second turbine is configured to operate at power levels corresponding to reactor power levels at or near one hundred percent of rated reactor power.

110. The nuclear reactor power system of claim 97, wherein the third cooling channel and the fourth cooling channel each comprises a cylindrical shape, a cylindrical axis of the third cooling channel being parallel to a cylindrical axis of the fourth cooling channel.

111. The nuclear reactor power system of claim 97, wherein a direction of first fluid coolant flow through the third cooling channel is the same as a direction of second fluid coolant flow through the fourth cooling channel.

112. The nuclear reactor power system of claim 97, wherein each of a first fluid coolant and a second fluid coolant comprises at least one of water, liquid metal, liquid salt, supercritical fluid, or gas.

113. The nuclear reactor power system of claim 97, wherein the reactor core comprises a fuel assembly region that includes a plurality of nuclear fuel elements that are arranged in parallel and that extend from a first end of the fuel assembly region to a second end of the fuel assembly region, the nuclear reactor power system comprising:
- a plate positioned adjacent to a first end of the fuel assembly region, the plate including one or more orifices configured to change in size to cause a change in a flow volume of a fluid coolant through the reactor core.

114. The nuclear reactor power system of claim 113, wherein:
- the plate is positioned between a coolant inlet and the fuel assembly region; and
- fluid coolant enters the fuel assembly region through the one or more orifices of the plate.

115. The nuclear reactor power system of claim 113, wherein the plate comprises a first plate, the system comprising a second plate positioned adjacent to the second end of the fuel assembly region.

116. The nuclear reactor power system of claim 113, wherein the plate is formed from at least one expandable material configured to expand or contract with changing temperatures.

117. The nuclear reactor power system of claim 116, wherein expansion or contraction of the at least one expandable material causes the change in the size of the one or more orifices.

\* \* \* \* \*